United States Patent [19]

Stetson, Jr. John B.

[11] Patent Number: 5,020,745
[45] Date of Patent: Jun. 4, 1991

[54] REACTION WHEEL FRICTON COMPENSATION USING DITHER

[75] Inventor: John B. Stetson, Jr., Newtown, Pa.

[73] Assignee: General Electric Company, East Windsor, N.J.

[21] Appl. No.: 454,651

[22] Filed: Dec. 20, 1989

[51] Int. Cl.$^5$ ................................................. B64G 1/28
[52] U.S. Cl. ..................................... 244/165; 364/434; 364/459; 244/164; 244/3.2
[58] Field of Search ............ 244/164, 165, 169, 3.20, 244/3.21, 3.22, 171, 166; 73/178 R; 364/434, 148

[56] References Cited

U.S. PATENT DOCUMENTS

| | | |
|---|---|---|
| 3,350,033 | 10/1967 | Goldberg . |
| 3,424,401 | 1/1969 | Maurer . |
| 3,493,194 | 2/1970 | Kurzhals . |
| 3,591,108 | 7/1971 | Perkel et al. . |
| 3,866,025 | 2/1975 | Cavanagh . |
| 3,968,352 | 7/1976 | Andeen . |
| 3,998,409 | 12/1976 | Pistiner . |
| 3,999,729 | 12/1976 | Muhlfelder et al. . |
| 4,071,211 | 1/1978 | Muhlfelder et al. . |
| 4,211,452 | 7/1980 | Poubean ................ 244/165 |
| 4,272,045 | 6/1981 | Phillips . |
| 4,361,073 | 11/1982 | Oelrich et al. . |
| 4,470,562 | 9/1984 | Hall et al. ................ 244/3.2 |
| 4,521,855 | 6/1985 | Lehner et al. . |
| 4,567,564 | 1/1986 | Bittner et al. . |
| 4,752,884 | 6/1988 | Slafer et al. . |
| 4,767,084 | 8/1988 | Chan et al. . |

*Primary Examiner*—Galen Barefoot
*Attorney, Agent, or Firm*—William H. Meise

[57] ABSTRACT

A reaction-wheel stabilized spacecraft reduces attitude errors at wheel reversals by application of a dither component to the wheel torque command signal.

6 Claims, 4 Drawing Sheets

REACTION WHEEL FRICTON COMPENSATION USING DITHER

The invention described herein was made in the performance of work under NASA Contract No. NAS5-32000 and is subject to provisions of Section 305 of the National Aeronautics and Space Act 1958, as amended (72 STAT. 2/35; 42 USC 247).

BACKGROUND OF THE INVENTION

This invention relates to attitude control systems for spacecraft using reaction wheels, and more particularly to reduction in attitude errors during times when the wheel speed is reduced to zero and the direction of rotation is reversed.

Spacecraft have become important as platforms for communications or sensors. As a platform, the position or attitude of the spacecraft in space must be maintained constant relative to a distant object, such as the heavenly body which it orbits. In the absence of stabilization of the attitude of the spacecraft, the sensors or communication devices cannot be pointed in the desired direction with the desired accuracy.

Certain types of spacecraft are stabilized by spinning about an axis. With such spacecraft, the attitude of the spacecraft in inertial space remains essentially constant. While this may be desirable when a sensor is to be directed along its axis toward a distant inertially fixed target such as a star, it is less advantageous when directing an instrument towards a target moving relative to the spacecraft (i.e., on the Earth). The use of despun platforms on spin-stabilized spacecraft allow instruments or antennas to be pointed in directions other than along the spin axis. However, because the attitude of a spin-stabilized spacecraft remains constant in inertial space as the spacecraft orbits the Earth, constant articulation is required to orient the platform toward a point on Earth, which may be undesirable for some purposes.

The attitude of some spacecraft may be maintained by controlled firing of attitude control thrusters, as described in U.S. Pat. No. 3,866,025, issued Feb. 11, 1975 to Cavanagh. Such systems if used alone tend to be short-lived because the amount of expendable fuel is finite.

Magnetic torquers may be used for attitude control, as also described by Cavanagh. Current is allowed to flow through torquing coils located on the spacecraft body, to cause interaction with the Earth's magnetic field. Magnetic torquing cannot produce large torques for fast correction of attitude errors because the Earth's magnetic field in space is small in magnitude and uncertain in direction.

Spacecraft may also be stabilized by the use of one or more momentum or reaction wheels, either alone or in conjunction with thrusters and/or magnetic torquers. A common arrangement includes the use of three or more reaction wheels, whose axes are orthogonal, or at angles that provide components along the three orthogonal spacecraft axes, thereby providing three-axis control of the spacecraft attitude. Such a system is described in U.S. Pat. No. 3,999,729 issued Dec. 28, 1976 to Muhlfelder et al. It should be noted that momentum wheels differ from reaction wheels only in that they are operated at rotational speeds which are high enough to provide gyroscopic stiffness. Momentum wheels are not ordinarily reduced to near-zero speed, as are reaction wheels.

As described at length in U.S. Pat. No. 3,998,409 issued Dec. 21, 1976 to Pistiner, the roll and yaw axis reaction wheels of a three-axis momentum stabilized spacecraft interchange their stored angular momentum on a quarter-orbit basis. As a result, the roll and yaw axis reaction wheels reverse their speed directions twice per orbit. Attitude sensors on the spacecraft sense the attitude of the spacecraft and produce error signals equal to, or representative of the difference between the actual spacecraft attitude and its desired attitude. These error signals are integrated and are converted into appropriate torque command signals for each reaction wheel. The resulting reaction wheel rotations produce reaction torques on the spacecraft that reduce its attitude error. The bearings supporting the reaction wheel's rotation ordinarily are of very high quality, but are subject to frictional forces. FIG. 1 illustrates a spacecraft 10 using a reaction wheel 12 affixed to an axle 14 mounted on bearings 16 supported by bearing blocks 18 and 20. A motor or torquer 22 is coupled to wheel 12 for applying torque to the wheel under control of a torque command signal applied over a bus 24 from a control unit 26. Control unit 26 generates the torque command signal based upon an attitude error signal applied over a bus 28 from an attitude sensor 30. Attitude sensor 30 senses errors in the attitude of the body of spacecraft 10 about wheel axis 8. When the wheel is rotating, the bearing friction includes a fluid friction component that increases with increasing velocity. Another component of friction is the Coulomb component, which is constant and independent of speed. FIG. 2 plots as 40 the torque T necessary to overcome Coulomb friction versus angular speed $\omega$ for a wheel such as 12 of FIG. 1. At positive values of $\omega$, the torque T has a positive value and for negative $\omega$ (the opposite direction of rotation), T has the same magnitude, but in the opposite direction. The constant component of Coulomb friction therefore exists down to and including zero rotational velocity. Static friction, which causes an increase in the force required to break the bearings away from a static or nonmoving condition, is generally small in the high quality bearings ordinarily used in conjunction with spacecraft reaction wheels. Static friction is suggested by dotted curve 42.

FIG. 3 illustrates, in simplified block diagram form, the control scheme described in the Pistiner patent. In FIG. 3, elements corresponding to those of FIG. 1 are designated by the same reference numeral. A spacecraft illustrated by the system of FIG. 3 uses attitude sensors and an integrator to produce a torque command signal on bus 24 for driving torquer 22 and reaction wheel 12. In order to control the attitude error on bus 28 to zero, the integrated error signal on bus 24 (which is the torque command signal) must be large enough to overcome the constant frictional force attributable to the Coulomb friction of the bearing. Thus, as the wheel slows toward and reaches zero speed, the torque command signal still has a finite value which represents the amount of the torque command signal required to overcome the Coulomb friction while the wheel rotates. When the reaction wheel stops, the attitude of the spacecraft about the wheel axis is no longer controlled, and attitude errors of spacecraft 10 can begin to accumulate. The attitude errors are sensed by sensor 30 and an error signal is produced and applied over bus 28 to integrator 60 of FIG. 3. Attitude errors continue to accumulate while the wheel is stopped, because the error signals must be applied to the integrator for a finite length of time in order to first reduce the residual (Coulomb-attributable) component of torque command signal to zero, and then to increase the torque command signal to a value sufficient to overcome the Coulomb and static friction required for rotation in the opposite direction. The torques required for rotation are illustrated in FIG. 2. During the period of integration, the attitude error tends to increase, and therefore the sensed error signal increases more than it would if attitude control were continuous and Coulomb friction were absent. Consequently, at the moment when reaction wheel rotation in the opposite direction begins, the error signal tends to be larger than necessary, and as a result the torque command signal is excessive. This overly large torque command signal in turn causes an overcompensation for the accumulated attitude error. Thus, in the absence of compensation for Coulomb friction, large attitude errors may be expected. FIG. 4 illustrates as a plot 70 the reaction wheel speed time history. In FIG. 4, the wheel speed is decreasing linearly toward zero speed before time T1. Ideally, the direction of rotation should simply reverse, and the wheel speed should increase in the opposite direction, as illustrated by dotted line 71. Due to Coulomb and static friction, the wheel remains stopped in the interval from time T1 until time T2. During this time, the control circuit reverses the torque command signal and increases its magnitude, until the torque is sufficient to overcome bearing friction at time T2, and the wheel then accelerates. At time T2, however, the torque command signal is large enough to cause a temporary overcorrection or overshoot of the path it would follow in the absence of friction illustrated as a curved portion 72 of plot 70.

FIG. 5a is a plot of the results of a computer simulation of the attitude error and wheel speed of a spacecraft using reaction wheel attitude control without Pistiner's correction. Dotted curve 80 represents wheel speed, which reverses direction of about 1000 seconds. Solid-line plot 82 represents the attitude error. As illustrated, the effects of reaction-wheel bearing friction result in a peak attitude error of about 52 arc-seconds in the interval 1000 seconds to about 1020 seconds, during which time the reaction wheel is stopped. Immediately after 1020 seconds, the wheel accelerates, and a recovery attitude undershoot of eight arc-seconds occurs.

The Pistiner arrangement recognizes that the integrator output signal includes information relating to the magnitude of the Coulomb friction. In the Pistiner arrangement, an offset signal compensator illustrated in FIG. 3 as block 52 generates an offset signal which is applied to an adder 54 and summed with the torque command signal to overcome the Coulomb friction. The magnitude of the offset is established by sensing the wheel rotational speed by a sensor 50, noting the magnitude of the torque command signal at some wheel rotational speed in the range of 5 to 10 RPM, and performing calculations which are intended to subtract out the components which are attributable to known factors, such as orbital precession torques, whereupon the remaining magnitude of the torque command signal is assumed to correspond to value $+T_c$ of FIG. 2, the Coulomb attributable friction torque. Once the magnitude of the component of the torque command signal attributable to the Coulomb bearing friction is found, its value is doubled to $2T_c$ (since the value must be reduced to zero and then increased back to the same value in the opposite direction), inverted in phase ($-2T_c$) and then added (in summer 54) to the torque command signal. When $-2T_r$ is summed with a torque command signal including a component of $+T_c$, the resulting summed torque command signal includes a reversed component with an amplitude $-T_c$, which is exactly what is necessary to overcome the Coulomb friction when wheel reversal takes place. This technique is effective in reducing attitude errors. FIG. 5b illustrates the improved spacecraft attitude response when offset compensation is used in the Pistiner manner. FIG. 5b is similar to FIG. 5a, and corresponding plots are designated by the same reference numerals. As illustrated in FIG. 5b, the wheel speed represented by dashed line 80, while not stopped for a sustained period near 1000 seconds as in the uncompensated case of FIG. 5a, is nevertheless perturbed. The spacecraft attitude builds up to an error of about 10 arc-seconds. This occurs because the offset does not exactly cancel the actual reaction wheel friction. In the Pistiner arrangement, integrated error signal components attributable to sources which are not taken into account in the offset calculation will result in an incorrectly calculated torque command signal Such errors might arise due to environmental or internal disturbance forces an torques active on the spacecraft. Also, the effective reversal of $T_c$ at a wheel rotational velocity of $\omega=10$ RPM itself tends to perturb the attitude, by slowing the wheel by more than the expected amount, which again contributes to attitude error.

If the offset signal which is added to the torque command signal in the Pistiner arrangement deviates in magnitude from the true value required for the overcoming of friction, the result will be similar to that which occurred in the absence of compensation, namely attitude errors due to undercompensation or overcompensation. An improved reaction wheel attitude control arrangement is desired.

SUMMARY OF THE INVENTION

A reaction wheel stabilized spacecraft according to the invention includes a spacecraft body, and at least one reaction wheel mounted for rotation about an axis on the body. A controllable torquing arrangement is coupled to the wheel for applying torque to the wheel in response to a torque command signal for accelerating or decelerating the reaction wheel and thereby transferring momentum to the spacecraft body. Sensors are mounted on the spacecraft body for sensing the spacecraft attitude and for generating a signal in response to the deviation of the body from a desired rotational position about the axis. A control arrangement includes an integrator coupled to the sensor for generating an attitude-sensitive component of the torque command signal. A summer receives the attitude-sensitive component of the torque command signal and an alternating signal for generating a dithered torque command signal.

DESCRIPTION OF THE INVENTION

Figure 1:
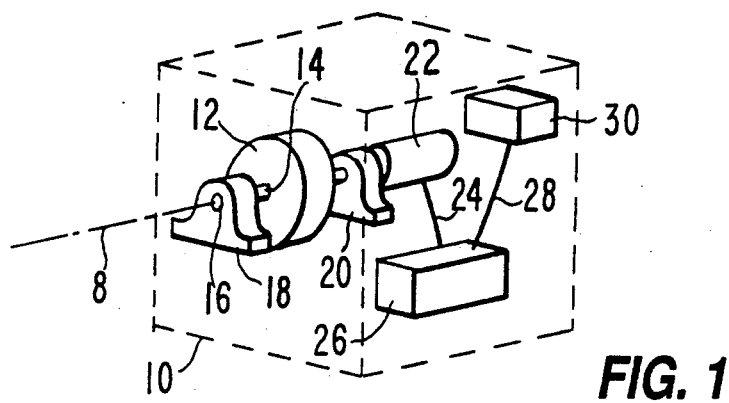
FIG. 1 illustrates a spacecraft including a reaction wheel attitude control system.
Figure 2:
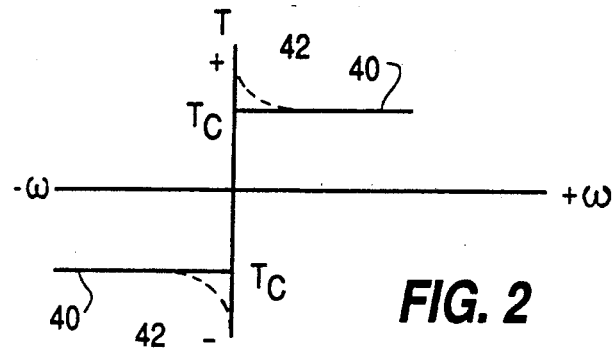
FIG. 2 illustrates a plot of torque versus speed shown at the static and Coulomb friction relationship for the reaction wheel bearings of FIG. 1.
Figure 3:
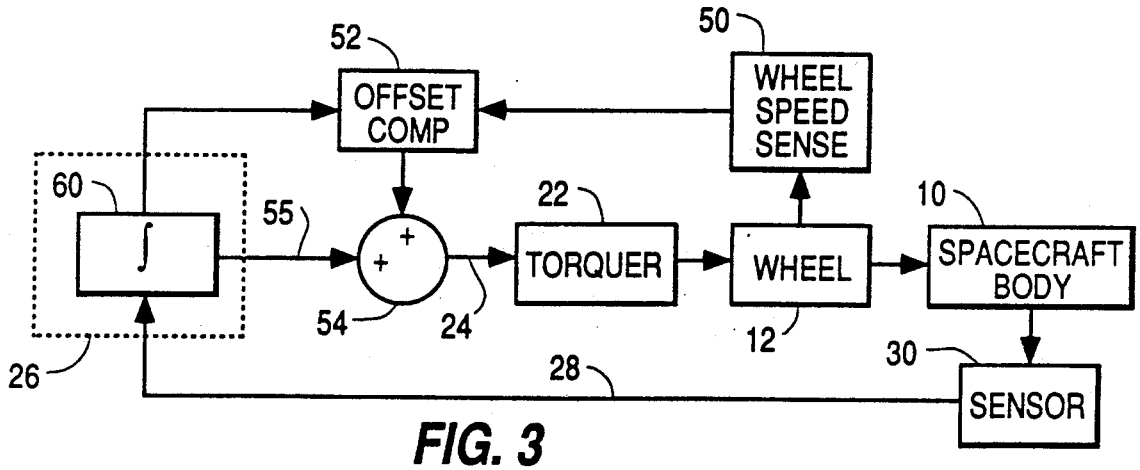
FIG. 3 illustrates in block diagram form a prior art Coulomb friction compensation arrangement.
Figure 4:
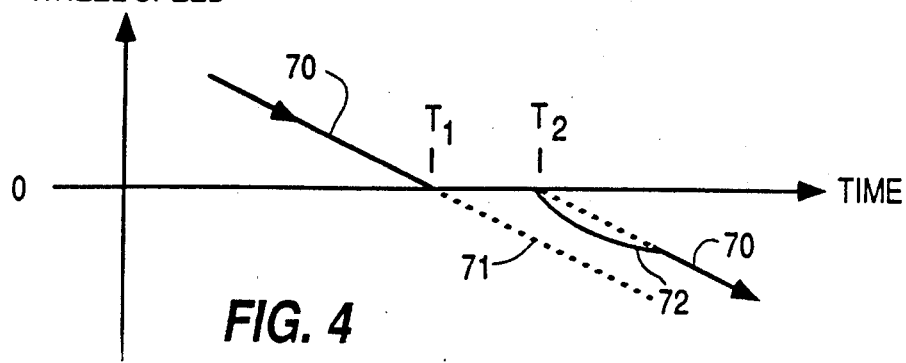
FIG. 4 conceptually illustrates the wheel speed compensation resulting from the use of the arrangement of FIG. 3 versus time.
Figure 5A:
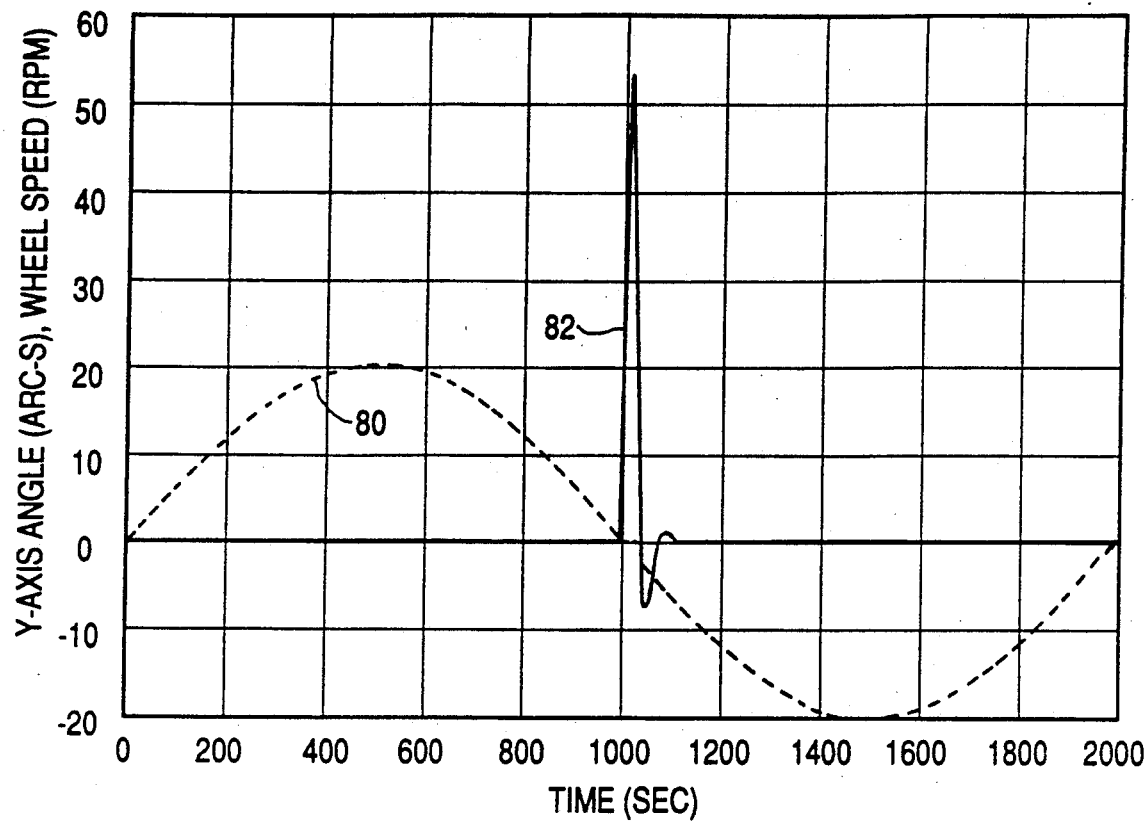
FIGS. 5a and 5b illustrates simulated spacecraft attitude and wheel speed for an uncompensated system, and for a system using the compensation of FIG. 3, respectively.
Figure 5B:
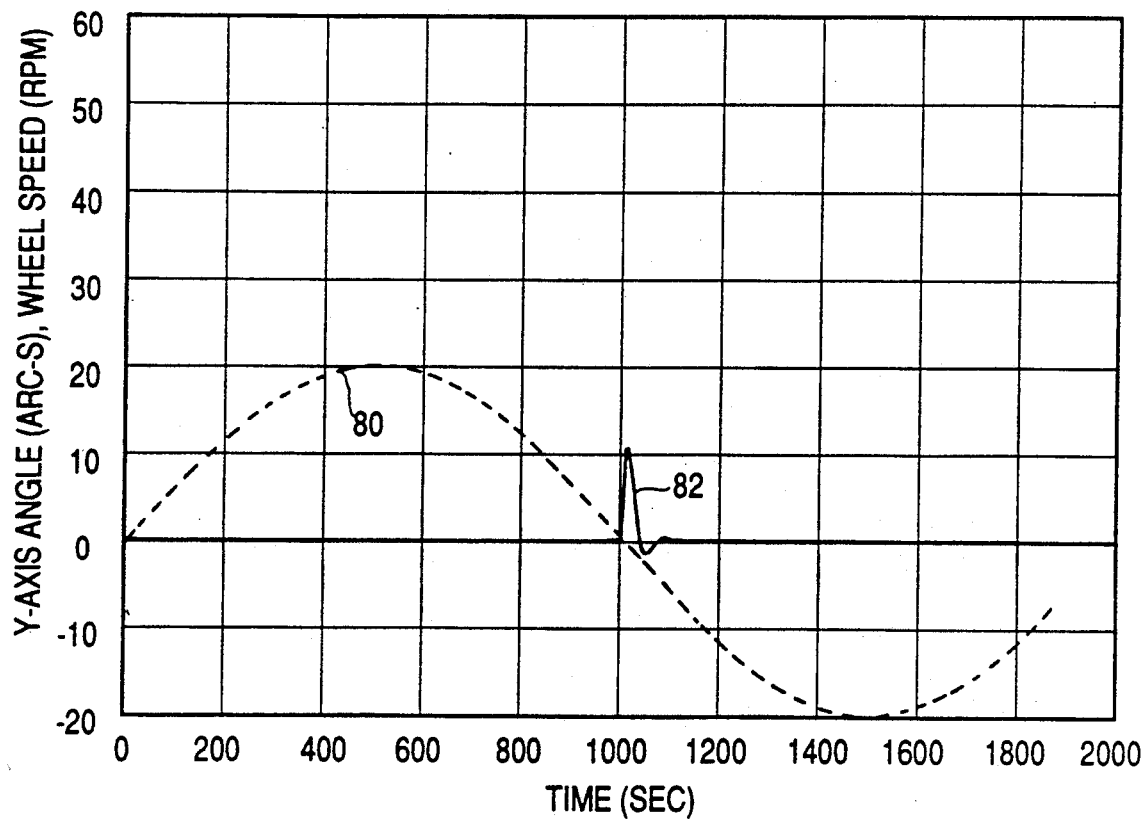
Figure 6:
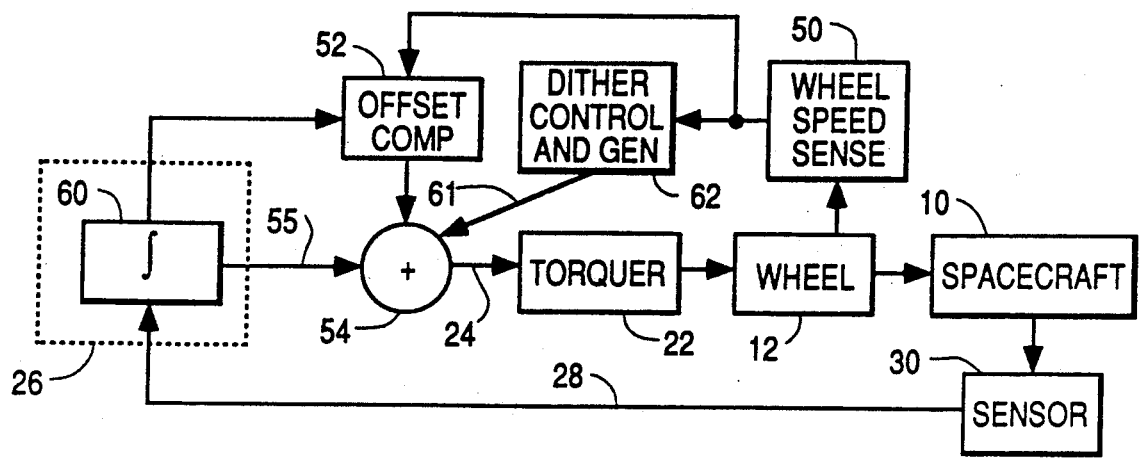
FIG. 6 is a block diagram of an attitude control arrangement in accordance with the invention.

FIG. 6 is a simplified block diagram of a spacecraft control system according to the invention. Elements of FIG. 6 corresponding to those of FIG. 3 are designated by the same reference numerals. FIG. 6 differs from FIG. 3 by the inclusion of a further control block designated 62, which is coupled to wheel speed sensor 50 for receiving wheel speed information, and which is also coupled to summer 54 for adding a further component to the torque command signal applied over bus 24 to torquer 22.

At the microscopic level, the bearings upon which the reaction wheel rides are imperfect. Conceptually, these imperfections may be considered to be lumped at a particular spot on the periphery of the bearing, so that as the reaction wheel is barely turning preparatory to stopping, it "falls into a hole" which is the imperfection in the bearing. In order to leave the hole, energy must be imparted to the wheel which is greater than that required to rotate at constant velocity. Any additional energy added in the form of a torque command signal is integrated by the reaction wheel itself to produce an attitude error of the spacecraft. Such an attitude error will be sensed by sensor 30 and applied over bus 28 to integrator 60 of control circuit 26, and is integrated to produce an additional torque command component.

Figure 7:
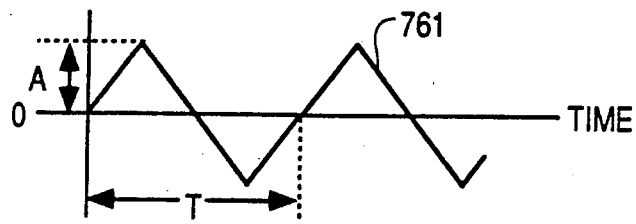
FIG. 7 is an amplitude-time plot which illustrates a dither signal which may be used with a control system according to the invention.

In accordance with an aspect of the invention, control block 62 of FIG. 6 generates a dither signal illustrated at 761 of FIG. 7. In FIG. 7, dither signal 761 is a triangular signal having a peak amplitude of A and a period of T, whereupon the frequency is $2\pi/T$. The frequency is selected to be much greater than the time constant of the spacecraft motion. More specifically, the frequency is selected to be greater than the highest damped natural frequency of the spacecraft body and of any flexible appendages thereof, such as masts or booms. In addition, the areas under the positive and negative excursions of dither signal 761 about zero amplitude during each half-cycle are equal, whereupon the net amplitude is zero. Consequently, energy which is added during one half-cycle of dither is subtracted during the other half-cycle dither, and no net energy is added. Since no net energy is added, the reaction wheel integrates the dither signal to zero, which creates no integrated attitude error. However, during one or the other half-cycle of the dither, sufficient energy is available to overcome the Coulomb friction and to start the wheel into rotation.

Figure 8:
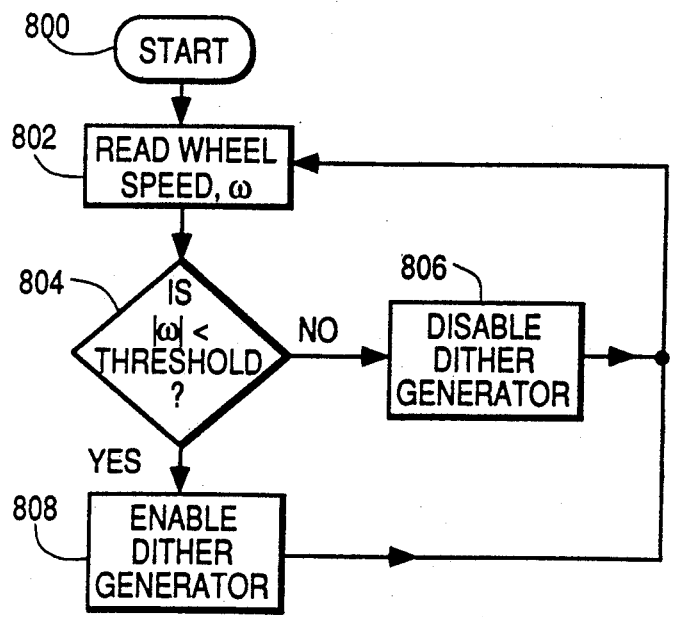
FIG. 8 is a flow chart which may be associated with the arrangement of FIG. 6.

FIG. 8 is a flow chart illustrating a control circuit which may be associated with dither control and generator block 62 of FIG. 6. In FIG. 8, the logic flow begins at a start block 800 and proceeds to a block 802 which represents the reading of wheel speed $\omega$ from wheel speed sensor 50 of FIG. 6. The logic flows to a decision block 804 in which the absolute value of wheel speed $\omega$ is compared with a threshold. The threshold wheel speed may be the same as that used for enabling offset compensator 52, or it may be a different wheel speed. If the absolute value of the wheel speed is greater than the threshold, the logic flows from decision block 804 by the NO path, and arrives at a block 806 which disables the dither generator (a part of block 62, not separately illustrated), whether or not it was previously enabled. The logic then exits block 806 and returns to block 802. The logic continuously flows in a loop including blocks 802, 804 and 806. Eventually, the wheel speed will be below the threshold value. In that case, the logic will exit from decision block 804 by the YES output, and will flow to a further block 808, which represents enabling of the dither generator. The logic then returns to block 802 and continues its circulatory flow about the loop including blocks 802, 804 and 808 until such time as the wheel speed once again exceeds the threshold value.

Figure 9:
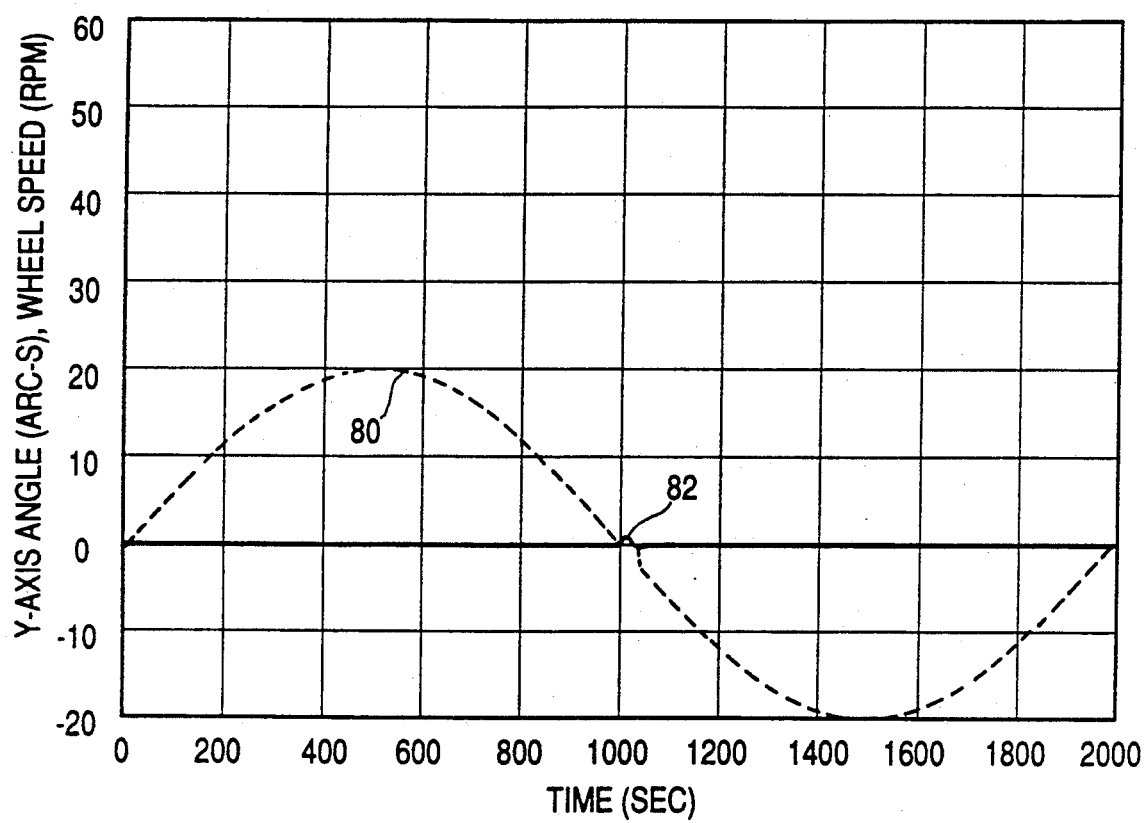
FIG. 9 is a plot similar to FIGS. 5a and 5b of attitude and wheel speed versus time for an arrangement in accordance with the invention.

FIG. 9 illustrates the reduction in attitude error attributable to the invention. Because of the dither signal, applied when the wheel speed falls below the 10 RPM threshold, the wheel never gets stuck so it maintains continuous control of the spacecraft attitude. The small residual error results from parameter uncertainties in the reaction wheel electronics and quantization of wheel speed by the logic shown in FIG. 8.

Other embodiments of the invention will be apparent to those skilled in the art. For example, the dither signal can be sinusoidal, rectangular wave, or any other waveform which is symmetrical about the zero axis. The dither generator may run continuously and its signal gated by a switch under the control of the logic of FIG. 8, or the generator may be disabled during those periods when it is not in use, and turned on to produce dither signal only when needed. The amplitude of the dither signal may be made to vary in inverse relationship to the magnitude of the wheel speed, so that maximum amplitude is reached near zero wheel speed. The invention may apply to a momentum wheel if the wheel for any reason might be stopped in a normal operating mode.

What is claimed is:

1. A reaction-wheel stabilized spacecraft, comprising:
   a spacecraft body;
   at least one reaction wheel mounted for rotation about an axis on said spacecraft body;
   controllable torquing means coupled to said spacecraft body and to said wheel for applying torque to said wheel in response to a torque command signal for acceleration or deceleration thereof for transferring momentum to said spacecraft body;
   sensing means mounted on said spacecraft body for sensing the attitude of said spacecraft body, and for generating a signal in response to deviation of said spacecraft body from a desired rotational position about said axis;
   control means including integrating means coupled to said sensing means for generating an attitude-sensitive component of said torque command signal;
   summing means including a first input port coupled to said control means and an output port coupled to said torquing means, for receiving said attitude-sensitive component of said torque command signal from said control means, and further including a second input port, for combining said attitude-sensitive component of said torque command signal with a signal applied to said second input port of said summing means to generate said torque command signal; and alternating signal generating means coupled to said second input port of said summing means for generating a signal of alternating polarity and for applying said signal of alternating polarity to said second input port of said summing means, whereby said torque command signal may include an alternating component.

2. A spacecraft according to claim 1 wherein said signal of alternating polarity alternates at a frequency which is higher than the highest dominant damped material frequency associated with the spacecraft and any flexible appendage.

3. A spacecraft according to claim 1 wherein said alternating signal generating means further comprises:

wheel speed sensing means coupled to said reaction wheel for sensing the rotational speed thereof and for generating a speed signal representative of said rotational speed;

amplitude control means coupled to said wheel speed sensing means and responsive to said speed signal for causing said signal of alternating polarity to be applied to said second input port of said summing means when the wheel speed represented by said speed signal is relatively low, and for reducing the magnitude of said signal of alternating polarity when the wheel speed represented by said speed signal is relatively high.

4. A spacecraft according to claim 3, wherein said amplitude control means comprises switch means for coupling said signal of alternating polarity to said second input port of said summing means with full amplitude when said wheel speed is relatively low, and for decoupling said signal of alternating polarity from said second input port of said summing means when said wheel speed is relatively high, for thereby reducing the amplitude to zero.

5. A method for controlling the attitude of a spacecraft about the axis of a bearing-mounted wheel, comprising the steps of:

sensing the attitude of said spacecraft about the axis of a reaction wheel to generate an error signal;

integrating said error signal to produce a torque command signal;

torquing said reaction wheel in response to said torque command signal in a manner tending to stabilize said attitude of said spacecraft, whereupon the direction of rotation of said reaction wheel may from time to time reverse;

sensing the rotational speed of said reaction wheel; and at rotational speeds near zero rotational speed, adding an alternating-polarity signal to said torque command signal.

6. A method according to claim 5 wherein said step of adding includes the step of controlling said alternating-polarity signal so that its average value is zero.

* * * * *

UNITED STATES PATENT AND TRADEMARK OFFICE
CERTIFICATE OF CORRECTION

PATENT NO.    : 5,020,745

DATED         : June 4, 1991

INVENTOR(S)   : John B. Stetson, Jr.

It is certified that error appears in the above-identified patent and that said Letters Patent is hereby corrected as shown below:

Column 4, line 2, "$-2T_r$" should be -- $-2T_c$ --

Column 4, line 24, "an" should be -- and --

Signed and Sealed this

Twenty-second Day of September, 1992

Attest:

DOUGLAS B. COMER

*Attesting Officer*    Acting Commissioner of Patents and Trademarks